Patented Mar. 17, 1942

2,276,309

UNITED STATES PATENT OFFICE 2,276,309

FORMALDEHYDE - POLYALKYLENE POLY-AMINE CONDENSATION PRODUCTS AND PRODUCTION THEREOF

Hans Georg Hummel, Mannheim, and Michael Jahrstorfer, Ludwigshafen-on-the-Rhine, Germany, assignors, by mesne assignments, to General Aniline & Film Corporation, New York, N. Y., a corporation of Delaware No Drawing. Application March 19, 1937, Serial No. 131,824. In Germany March 19, 1936

6 Claims. (Cl. 260—72)

The present invention relates to new nitrogenous condensation products and a process of producing same.

We have found that valuable nitrogenous condensation products can be obtained by causing formaldehyde to act on polyalkylene polyamine substances, i. e. the substitution products of polyalkylene polyamines. The formaldehyde may be used in the monomeric or polymeric form and in any physical state.

Suitable initial materials are for example the subsequently listed substitution products of diethylene triamine, triethylene tetramine, tetraethylene pentamine and the higher members of the said series or mixtures of such amines such as are obtained for example as by-products in the preparation of ethylene diamine from ethylene halides and ammonia. Substitution products of polyalkylene polyamines in which the nitrogen atoms are connected by straight alkylene chains other than the ethylene radicle or by branched alkylene radicals of any size (for example 1.2- or 1.3-propylene radicals) may also be used, whereby the same or different carbon chains may be present in one molecule. The polyamines may also contain carbon-containing chains interrupted by hetero atoms, as for example oxygen and sulphur.

As substitution products of polyalkylene polyamines which are very suitable as initial materials may be mentioned for example those obtainable by the reaction of aliphatic halogen compounds, as for example chlorinated paraffin wax or chlorinated substances containing carboxylic groups, such as chlorinated montan wax acids, with polyalkylene polyamines. Substitution products of the said kind may be obtained for example in an advantageous manner by causing halogen-containing aliphatic, cycloaliphatic or naphthenic compounds of high molecular weight to react with such amounts of polyalkylene polyamines that there are at least about 2 molecular proportions of polyalkylene polyamine for each halogen atom to be split off during the condensation. The reaction may be carried out for example by heating the halogen-containing compound together with 2 or more than 2 molecular proportions of polyalkylene polyamine per atom of halogen to be split off. It is often advantageous to heat for from 1 to 2 or more hours to boiling under reflux, preferably in the absence of diluents or solvents or solvent agents. From the hydrogen halide split off and the excess of polyalkylene polyamine there is then formed the hydrohalide which is usually in an oily form and, since it is practically insoluble in the reaction mixture, may readily be directly separated, for example by decantation, running off, centrifuging or, when the hydrohalide is solid, by filtration. The condensation product, on the contrary, is obtained as such and not as the hydrohalide; free excess polyalkylene polyamine may be readily removed therefrom, for example by distillation in vacuo. Generally speaking, these products are practically free from halogen. The polyalkylene polyamines may also be condensed consecutively with different halogen-containing compounds of the said kind, as for example first with chlorododecyl alcohol and then with chlorstearic acid or vice versa.

As components to be condensed with the polyalkylene polyamines may be mentioned for example alkyl halides of high molecular weight, such as octyl bromide, dodecyl chloride, octodecyl bromide, chlorinated hard or soft paraffin wax, chlorinated ozokerite, chlorinated middle oils (oils obtained from mineral oils or from the oils obtained by the hydrogenation of coals and the like), halogenated alcohols, as for example chlorinated octodecyl alcohol, halogenated ketones, such as chlorinated dodecanone, and chlorinated ethers, such as alphachlormethyldodecyl ether.

Compounds obtained by the halogenation or the addition of halogen or hydrogen halides to unsaturated aliphatic compounds may also be used with advantage, as for example mono- and dichlorundecane, and also chlorinated oleyl alcohol, chlorinated olefines of high molecular weight arising from the cracking of hydrocarbon oils and chlorinated saturated or unsaturated acids, such as mono- or polychloroleic acid or -ricinoleic or -stearic acid, chlorinated beef tallow, chlorinated waxes and wax acids, montanic acids, halogenated resin acids and naphthenic acids and chlorinated fatty acid mixtures obtained by the oxidation of paraffin wax. Halogen-containing di- and polycarboxylic acids may also be condensed with advantage with polyalkylene polyamines, as for example chlorinated adipic acid, chlorinated or brominated sebacic acid and chlorinated dicarboxylic acids arising from the oxidation of paraffin wax and the like with nitric acid or nitrous gases. Instead of the free halogen-containing acids, their derivatives, as for example their esters, acid halides or anhydrides, may also be used.

Substitution products suitable as initial materials for the reaction with formaldehyde may also be prepared by the reaction of other, non-halogen-containing, aliphatic or cyclic compounds containing carboxylic groups with polyalkylene polyamines, aliphatic saturated or unsaturated monobasic or polybasic carboxylic acids (which may also contain hydroxyl groups) and mixtures of the same, resin acids, such as abietic acid, and reaction products of colophony with maleic anhydride are suitable for this purpose.

Especially valuable starting components for the condensation with formaldehyde are those derivatives of polyalkylene polyamines or their substitution products (for example those described above) in the molecules of which one of the nitrogen atoms present bears a carboxylic acid amide (—CO—NH₂) or a thiocarboxylic acid amide group (—CS—NH₂).

The preparation of these polyalkylene polyamine derivatives may be effected in various ways. For example salts of polyalkylene polyamines and their derivatives may be caused to react with cyanates or thiocyanates. Free cyanic or thiocyanic acid may also be allowed to act on the polyalkylene polyamines or their derivatives. Use may also be made of the thermal decomposition of urea into ammonia and cyanic acid by heating the polyalkylene polyamines or their derivatives with urea at elevated temperatures. Finally carbamic acid chloride or thiocarbamic acid chloride may be brought to reaction with the polyalkylene polyamines and their derivatives, advantageously in the presence of inert solvents.

The relative proportions of polyalkylene polyamines and formaldehyde may be varied within wide limits, the nature of the reaction products thus being influenced. The nature of the initial materials is also of influence on the properties of the final products. The condensation of the substitution products of the polyalkylene polyamines with formaldehyde may be carried out in various ways. Since the nitrogenous initial materials are soluble or readily dispersable in water, the condensation may be carried out in aqueous media. The substitution products of the polyalkylene polyamines in many cases yield in aqueous media with formaldehyde first a slimy flocculation which further condenses on heating with the separation of water.

The condensation may also be carried out in other solvents or diluents for example alcohols esters or ketones solvents in which the nitrogenous initial materials dissolve are especially advantageous. The formaldehyde may also be used in aqueous solution in this case, the water being removed before or during the reaction if desired. If the formaldehyde be used in polymeric form, as for example as trioxymethylene, fusion in the absence of diluting media may be used. The formaldehyde may also be introduced in the vapor phase. The polyalkylene polyamine derivatives may also first be absorbed in porous substances, such as natural or artificial fibres, and formaldehyde, for example, in the gaseous state, allowed to act thereon.

The products obtainable according to this invention are, after drying, usually water-insoluble masses which dissolve in organic solvents. They may be used for a great many technical purposes. For example they may be used as impregnating agents for textiles for the purposes of producing a water-repelling action, as softening additions to lacquers or artificial compositions or for improving the properties of waxes and wax preparations. A special advantage lies in the fact that by using the products obtainable according to this invention the impregnation of textiles may be carried out in a single bath and continuously.

The condensation products may also be produced on or in the fibre.

The following examples will further illustrate the nature of this invention but the invention is not restricted to these examples. The parts are by weight.

*Example 1*

50 parts of a product obtained by the reaction of a chlorinated paraffin wax containing from 11 to 12 per cent of chlorine with triethylene tetramine are dissolved in 100 parts of water, 25 parts of 30 per cent formaldehyde are added to the said solution after it has been heated to 80° C. The condensation product which is at first deposited in a fine dispersion conglomerates to a white spongy mass upon further heating. After separating the excess of liquid containing formaldehyde, the condensation product is dried at 120° C. A pale brown colored, viscous, soft product similar to factice is obtained.

*Example 2*

40 parts of a condensation product of stearic acid and triethylene tetramine are dissolved in 100 parts of alcohol and heated for an hour to boiling under reflux with 6 parts of paraformaldehyde. After distilling off the alcohol, there remains a sticky, yellow fatty mass having an acid value of 1.4.

*Example 3*

50 parts of a reaction production of triethylene tetramine with a mixture of 2 parts of stearic acid and 1 part of adipic acid are heated with 100 parts of water. The yellow, paste-like emulsion formed yields, by the addition of 25 parts of 30 per cent aqueous formaldehyde, a thick white flocculent precipitate. The dried product is a yellow, soft, resinous mass.

*Example 4*

45 parts of the condensation product of 12-hydroxy-stearic acid (obtained by saponification of hydrogenated castor oil) and triethylene tetramine are heated to boiling with 7.5 parts of trioxymethylene in 100 parts of alcohol for two hours under reflux. After removing the alcohol, there remain 50 parts of a tough, pale yellow, resinous product which has a dropping point of 122° C.

*Example 5*

100 parts of a wax-like condensation product from montan wax acids (obtained according to Patent 1,777,766) and diethylene triamine, which has a melting point of 90° C., are dissolved in 300 parts of alcohol. After adding 15 parts of paraformaldehyde, the mixture is heated to boiling. The alcohol is then removed and 110 parts of a yellow, wax-like product are obtained.

*Example 6*

100 parts of the reaction product of montan wax acids (obtained according to Patent 1,777,766) with triethylene tetramine are heated with 500 parts of water in an open enamelled vessel, a mobile white emulsion thus being obtained. A mixture of 50 parts of 30 per cent aqueous formaldehyde and 100 parts of water is added to the emulsion. A thick, tough, conglomerating flocculent precipitate is immediately formed. It is separated from the liquid containing the excess of formaldehyde. The porous, pale yellow, elastic mass is comminuted and dried at 100° C. The resulting voluminous powder yields by heating to from 130° to 140° C., 100 parts of a pale brown, hard, wax-like product having a melting point of from 95° to 100° C., which softens to a resinous mass, capable of being drawn into threads, by heating.

The melting point, the stability to hot water and the other properties of the product thus obtainable are dependent on the amount of formaldehyde used. It is soluble in waxes and imparts valuable properties to the same.

If viscose cellulose wool, dehydrated by means of alcohol, be treated with a 1 per cent alcoholic solution of the wax-like condensation product obtained according to paragraph 1 of this example, there is obtained after drying the viscose cellulose wool at from 70° to 80° C. a strongly water-repelling fibre having a soft, pleasant touch which retains these properties even after washing with water at 60° C.

Example 7

Wet, deacidified viscose artificial silk cut into staple fibres is impregnated for 20 minutes at 70° C. with a 1 per cent solution in water of the condensation product from montan wax acids and triethylene tetramine described in Example 6 and carefully hydroextracted. The goods thus treated are immersed for 20 minutes in a 20 per cent aueous solution of formaldehyde heated to 70° C., the excess of adherent aldehyde being removed by a short hydroextraction. After drying for several hours at 100° C., a waterproof, loose, soft material is obtained, which is not wetted even after lying in water for several days.

Example 8

50 parts of a product obtainable by the condensation of a mixture of equal parts of industrial montan wax acids and adipic acid with triethylene tetramine are stirred into a stiff paste with 100 parts of water and then 25 parts of 30 per cent formaldehyde are added while heating. The mass which immediately separates becomes compact upon further heating and yields an elastic product, capable of being drawn into threads, which is converted by heating to 120° C. into a yellow-red, soft resin.

By varying the relative proportions of the montan wax acids and adipic acid, products may be obtained having waxy to soft resinous properties. Other di- or polycarboxylic acids, such as oxalic acid, sebacic acid or the mixtures of dicarboxylic acids obtainable by the oxidation of paraffin wax and the like may be used instead of adipic acid.

Example 9

50 parts of a water-soluble, brittle resin obtained by the reaction of triethylene tetramine with the condensation product of colophony and maleic anhydride are dissolved in 100 parts of water and 25 parts of 30 per cent formaldehyde are added. The precipitated mass which becomes tough after boiling yields after drying 50 parts of a brittle, red, transparent resin.

Example 10

Wet, deacidified viscose artificial silk, for example staple fibre (short cut fibre) obtainable according to U. S. Patent 2,065,175, or reeled thread obtained therefrom is immersed for 30 minutes in a solution, heated to 70° C., containing 1 per cent of the condensation product of montan wax acids and triethylene tetramine specified in Example 6 and 2.5 per cent of Glauber's salt. The hydroextracted fibres are laden with formaldehyde vapour and then dried. The material thus obtained is treated with a soap solution and soft, open goods obtained which even after having been washed several times still have a good resistance to wetting by water.

Example 11

200 parts of a reaction product of chlorinated hard paraffin wax and triethylene tetramine, obtained according to Example 1 are mixed with 500 parts of water, neutralized to methyl orange with hydrochloric acid and there is added an aqueous solution of 120 parts of potassium cyanate. After evaporating the solution, heating for several hours at 120° C. and removing the potassium chloride formed with alcohol, 280 parts of a hard, brittle, pale brown product are obtained.

100 parts of the said product are dissolved in 400 parts of water, 150 parts of 30 per cent aqueous formaldehyde then being added to the clear liquid having a slight alkaline reaction. By acidification with mineral acid, a thick, tough coagulate is precipitated which is freed from adherent acid by means of water and dried. A hard, granular product is obtained which is insoluble in almost all solvents.

Example 12

100 parts of the condensation product of equimolecular amounts by weight of montan wax acids (obtained according to the U. S. Patent 1,777,766) and triethylene tetramine are neutralized to methyl orange in aqueous emulsion with hydrochloric acid. After adding 30 parts of potassium cyanate dissolved in water, the whole is evaporated to dryness and the residue heated for several hours at 120° C. By extraction with alcohol or chlorinated hydrocarbons there are obtained after evaporating the solvent 110 parts of a hard, brittle product which may be ground to a pale yellow powder and which dissolves in hot water giving a clear, readily foaming colloidal liquid.

50 parts of the said product are dissolved in 500 parts of water while heating and 50 parts of aqueous 30 per cent formaldehyde solution are added. From the readily foaming, almost clear solution there is precipitated after the addition of mineral acid a thick mass which upon further heating increases in amount and agglomerates to a pale yellow colored elastic mass. After washing the condensation product with water and drying it, 50 parts of a very hard, brittle, yellow-brown substance are obtained.

Example 13

50 parts of the initial material specified in Example 12 are heated under reflux in alcohol with a slightly alkaline solution of 10 parts of trioxymethylene in alcohol. After adding a little concentrated hydrochloric acid a thick precipitate is formed which disappears again on further heating. After evaporating the alcohol there remain 50 parts of a transparent, yellow-red, very hard substance which has blown up into bubbles.

Example 14

500 parts of water-wet cellulose wool obtained from viscose artificial silk are heated for 30 minutes at 70° C. in an aqueous solution of 75 parts of the condensation product of montan wax acids, triethylene tetramine and potassium cyanate obtained according to Example 12 in 5000 parts of water. After hydroextraction, the resulting product is saturated with formaldehyde vapour and then dried. The textile material thus obtained is washed with soap and dried. A soft, open, readily carded fibre is obtained which even after floating on water for several weeks is still entirely unwetted and which is completely hydrophobic even after washing with solutions of washing agents having a strong action. The material remains hydrophobic even after boiling for half an hour with 0.5 per cent of soap and 0.3 per cent of soda.

*Example 15*

Freshly spun, water-wet flocks of cellulose wool are immersed at about 70° C. in an aqueous solution containing 1.5 per cent of the condensation product obtained according to Example 12 and 1 per cent of 30 per cent formaldehyde. After drying and washing with soap there are obtained hydrophobic soft, open flocks of fibre which are fast to boiling. The impregnation may also be carried out by continuously drawing through the bath freshly spun uncut viscose artificial silk or cotton. Curd soap and other additional substances may also be added to the solution.

*Example 16*

100 parts of the condensation product obtainable by the condensation of equimolecular amounts of montanic acids and triethylene tetramine are neutralized to methyl orange in aqueous emulsion with hydrochloric acid. After adding an aqueous solution of 40 parts of potassium cyanate there is precipitated after boiling for a short time a thick yellow precipitate. After cooling and/or diluting with water, the precipitate is advantageously freed from excess of water in a centrifuge or a separator. 410 parts of a homogeneous, pale yellow paste containing 75 per cent of water are obtained which is colloidally soluble in water.

100 parts of wet cellulose wool flocks are immersed for a short time at 70° C. in a solution containing 60 parts of the said paste and 10 parts of 30 per cent aqueous formaldehyde per 1000 parts of water. After hydroextracting and drying, a well hydrophobic, readily carded and elastic textile material fast to washing is obtained.

*Example 17*

An aqueous solution of 4 per cent of the condensation product obtainable according to Example 12 is uniformly dispersed in a viscose solution which has been ripened for spinning. The spun, acidified, washed and dried artificial silk threads are immersed at moderately elevated temperature in a 2 per cent solution of formaldehyde, centrifuged or squeezed off and dried. A textile material is obtained which is not wetted by water and which has increased absorptive power for acid dyestuffs. By washing with soap, the fastness to wetting by wetting agents, as for example alkylated naphthalene sulphonic acids, may be considerably increased.

*Example 18*

400 parts of the condensation product of equimolecular amounts of montan wax acids and triethylene tetramine are emulsified in 2000 parts of water and neutralized with mineral acid. A solution of 250 parts of potassium thiocyanate is then added and the whole evaporated to dryness. After heating the tough residue at 120° C. for several hours, the product is freed from the inorganic salts by extraction with chloroform. The yellow colored product remaining after evaporating the extraction agent is soluble in water and readily capable of being ground.

50 parts of this product are dissolved in 200 parts of alcohol and heated under reflux for an hour with a solution of 15 parts of paraformaldehyde in 100 parts of alcohol. After evaporating the alcohol there remains a hard, dark red colored substance which is capable of being drawn into threads when hot.

Cellulose wool flocks of viscose artificial silk are introduced for some minutes at 70° C. into an aqueous solution containing 1.5 per cent of the product obtained according to paragraph 1 of the present example and 1 per cent of formaldehyde. After hydroextraction, drying and soaping, a hydrophobic fibre of a character similar to wool is obtained which is fast to washing and boiling.

*Example 19*

Freshly spun fibres obtained according to U. S. Patent 2,065,175 or threads or fabrics obtained therefrom are immersed for about one minute at about 70° C. in an aqueous solution containing 1.5 per cent of the condensation product obtained according to Example 12 and 1 per cent of a 30 per cent formaldehyde solution. After hydroextracting, drying and washing with soap a soft strongly hydrophobic material having most valuable properties is obtained.

The said condensation product may also be distributed by stirring in cellulose xanthogenate; after the mass has ripened to the desired degree it is spun and the acidified threads are drawn through a 2 per cent aqueous formaldehyde solution. Another manner of working consists in drawing the ripened threads (without preceding addition of the said condensation product to the cellulose xanthogenate) through a 2 per cent formaldehyde solution containing 0.5 per cent of the said condensation product.

*Example 20*

500 parts of triethylene tetramine are heated with 200 parts of glacial acetic acid in a vessel provided with a descending cooler until 60 parts of water are distilled off. Heating is so regulated that the temperature at the upper end of the descending cooler does not surpass 100° C. A slightly viscous clear yellow oil giving clear solutions in water is obtained. To 100 parts thereof about 60 parts of a 30 per cent formaldehyde solution are slowly added while moderating the violent reaction by cooling with ice. After cautiously evaporating the solution and heating the residue to about 120° C. a reddish, transparent sticky highly viscous condensation product is obtained.

*Example 21*

200 parts of methyl propyl acetic acid

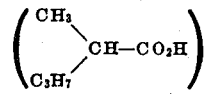

are heated with 480 parts of triethylene tetramine until 32 parts of water are distilled off. Not reacted triethylene tetramine is distilled off in vacuo, a reddish colored water-soluble oil remaining behind. To a warm solution of 50 parts thereof in 100 parts of water about 55 parts of a 30 per cent formaldehyde solution are added, an emulsion being formed at once. During heating a reddish viscous oil is formed; it is separated from the aqueous layer and freed from adhering water by heating to 120° C. It is a clear red sticky syrupy mass.

Example 22

190 parts of Roumanian naphthenic acids having an acid number of 291.2 are heated with 146 parts of triethylene tetramine until 18 parts of water are distilled off. 100 parts of the yellow clear tough liquid formed which has an acid number of 14 are dissolved in 160 parts of n-butyl alcohol, 65 parts of a 30 per cent formaldehyde solution are added and the mixture is heated. After distilling off the water and the butyl alcohol a brown, semi-solid, sticky product is obtained.

Example 23

80 parts of a condensation product from montan wax acids and triethylene tetramine are molten together with 20 parts of the ethylene glycol ester of montan wax acids. The melt is introduced into 250 parts of boiling water, 55 parts of a 30 per cent aqueous formaldehyde solution are added and the mixture is heated until the coagulation which sets in as soon as the formaldehyde is added, is completed. After drying the product is a hard brown wax having a beautiful superficial lustre and may be employed with advantage as an addition to wax preparations.

Example 24

100 parts of benzoic acid are heated with 130 parts of triethylene tetramine until about 17 parts of water are distilled off. A clear slightly yellow viscous liquid remains behind. 50 parts thereof are mixed with about 65 parts of a 30 per cent formaldehyde solution, the considerable development of heat being moderated by cooling with ice. Upon the addition of about 55 parts of a 20 per cent sodium chloride solution a yellow oil separates which after heating to 110° C. leaves behind a reddish-brown very tough product.

Example 25

100 parts of salicylic acid are heated together with 110 parts of triethylene tetramine until 13 parts of water are distilled off. 50 parts of the condensation product obtained which is an orange colored viscous oil are dissolved in alcohol, the solution being heated with 17 parts of trioxymethylene until the latter is completely dissolved. After evaporating the alcohol and heating the residue to 120° C. a brownish elastic resinous product is obtained.

Example 26

75 parts of anhydrous oxalic acid are heated with 146 parts of triethylene tetramine until 17 parts of water are distilled off. To 54 parts of the clear reddish oily condensation product 18 parts of trioxymethylene are added while stirring. A resinous soft transparent condensation product of reddish color is obtained.

Example 27

100 parts of crystallized adipic acid are heated with 200 parts of triethylene tetramine until 25 parts of water are distilled off. 50 parts of the tough syrupy yellow product obtained are dissolved in 100 parts of alcohol and the solution is heated with 15 parts of paraformaldehyde until the latter is dissolved. After evaporating the alcohol a jelly-like transparent product of reddish color is obtained.

Example 28

500 parts of the product obtainable by condensing a mixture of equal parts of montan wax acids and adipic acid with triethylene tetramine are emulsified in 2500 parts of water and concentrated hydrochloric acid is added until the mass reacts neutral to methylorange. 220 parts of sodium cyanate are added until the water is removed completely and the melted mass has acquired a temperature of 130° C. The brittle brown mass obtained is treated with alcohol and the alcoholic solution separated from the undissolved inorganic salts. After evaporating the alcohol a brown soft product giving clear solutions in water is obtained. 50 parts of this product are dissolved in water and 100 parts of an aqueous 30 per cent formaldehyde solution are added thereto. The mixture is evaporated to dryness. A reddish brown transparent elastic mass is obtained.

Example 29

100 parts of a condensation product obtained from 100 parts of dodecylbromide and 150 parts of triethylene tetramine are mixed with 200 parts of water and from 75 to 80 parts of concentrated hydrochloric acid whereby a mixture neutral to methylorange is obtained. After adding 52 parts of sodium cyanate and 100 parts of water the whole is evaporated to dryness and the residue heated for several hours at 130° C. The product is treated with toluene, the toluene-solution separated from the undissolved inorganic salts, and the toluene evaporated. A slightly brown, soft, water-soluble product remains behind. 50 parts thereof are emulsified in 250 parts of water and 40 parts of a 30 per cent aqueous formaldehyde solution are added. After the addition of some hydrochloric acid a yellowish-brown factice-like mass separates out which is washed with water and dried.

Example 30

50 parts of the condensation product of 1 mol of adipic acid and 2 mols of triethylene tetramine are dissolved in 100 parts of water and concentrated hydrochloric acid is added until the mass is neutral to methylorange. After adding 35 parts of sodium cyanate the mass is evaporated to dryness and the residue heated for 1 hour at 130° C. 50 parts of the slightly yellow sirupy product obtained are dissolved in 100 parts of hot water and 55 parts of a 30 per cent formaldehyde solution are added. After adding a small amount of sulphuric acid and partly evaporating the solution a faintly yellow factice-like product separates out.

Example 31

500 parts of the reaction product of stearic acid and triethylene tetramine are emulsified in 2500 parts of water and rendered neutral towards methylorange by means of concentrated hydrochloric acid. 290 parts of sodium cyanate are added, the whole is evaporated to dryness and the residue heated for several hours at 130° C. The product is dissolved in toluene separated from the undissolved inorganic salts. 100 parts of the yellow product remaining behind after the evaporation of the solvent are mixed with 250 parts of water, the emulsion formed is heated and about 30 parts of a 30 per cent formaldehyde solution is added. Upon the addition of some mineral acid the reaction product coagulates. It is washed for several times with hot water and dried, a brown tough mass of fatty consistency being obtained.

What we claim is:

1. The process for producing nitrogenous condensation products which comprises causing formaldehyde to react with a compound derived from a polyalkylene polyamine of the formula $H_2N-(X-NH)_y-H$ (wherein X is an alkylene group and y a whole number above 1) by substitution on the nitrogen by the acyl radicle of montanic acid and by one radicle selected from the class consisting of $-CO-NH_2$ and $-CS-NH_2$.

2. Nitrogenous condensation products from formaldehyde and compounds derived from polyalkylene polyamides of the formula $H_2N-(X-NH)_y-H$ (wherein X is an alkylene group and y a whole number above 1) by substitution on the nitrogen by the acyl radicle of montanic acid and by one radicle selected from the class consisting of $-CO.NH_2$ and $-CS.NH_2$.

3. The process of producing nitrogenous condensation products which comprises causing formaldehyde to react only with a compound selected from the class consisting of those derived from a polyalkylene polyamine of the formula $H_2N-(X-NH)_y-H$ (wherein H is an alkylene group and y an integer above 1), by substitution on at least one nitrogen atom by at least one substituent selected from the class consisting of the radicles $-R$ and $-CO.R'$ (wherein R stands for a hydrocarbon radicle containing at least 8 carbon atoms and R' stands for a carboxylated hydrocarbon radicle), and the derivatives of such compounds derived by further substitution on at least one nitrogen atom thereof by one substituent selected from the class consisting of $-CO.NH_2$ and $-CS.NH_2$.

4. Nitrogenous condensation products from formaldehyde and a compound selected from the class consisting of those derived from polyalkylene polyamines of the formula $H_2N-(X-NH)_y-H$ (wherein X is an alkylene group and y an integer above 1), by substitution on at least one nitrogen atom by at least one substituent selected from the class consisting of the radicles $-R$ and $-CO.R'$ (wherein R stands for a hydrocarbon radicle containing at least 8 carbon atoms and R' stands for a carboxylated hydrocarbon radicle) and the derivatives of such compounds derived by further substitution on at least one nitrogen atom thereof by one substituent selected from the class consisting of $-CO.NH_2$ and $CS.NH_2$, said formaldehyde and said compound being the only components of said condensation products.

5. The process of producing nitrogenous condensation products which comprises causing formaldehyde to react only with a compound derived from a polyalkylene polyamine of the formula $H_2N-(X-NH)_y-H$ (wherein X is an alkylene group and y an integer above 1) by substitution on at least one nitrogen atom by the acyl radicle of montanic acid.

6. Nitrogenous condensation products from formaldehyde and a compound derived from a polyalkylene polyamine of the formula $$H_2N-(X-NH)_y-H$$

(wherein X is an alkylene group and y an integer above 1) by substitution on at least one nitrogen atom by the acyl radicle of montanic acid, said formaldehyde and said compound being the only components of said condensation product.

HANS GEORG HUMMEL.
MICHAEL JAHRSTORFER.